Patented May 8, 1928.

1,669,129

UNITED STATES PATENT OFFICE.

WILLIAM IRBY, OF LYNN, MASSACHUSETTS, ASSIGNOR TO GENERAL ELECTRIC COMPANY, A CORPORATION OF NEW YORK.

ELECTRODE.

No Drawing.   Application filed January 7, 1927.  Serial No. 159,740.

My invention relates to arc lamp electrodes, and in particular to electrodes adapted for use in connection with the so-called luminous type of arc.

One of the objects of my invention is to provide a magnetite and ilmenite electrode in which a flux of sodium fluoride and lithium fluoride is used; another object of my invention is to provide an electrode for use in connection with a luminous arc in which the candle power operation and life of the electrode are materially increased and improved.

It is common practice to make flaming arc electrodes by using a mixture of ilmenite, chromite, and magnetite, but to this combination of elements I propose to add a small percentage of sodium fluoride and lithium fluoride as a flux.

I find that when lithium fluoride is used together with sodium fluoride as a double flux in an electrode made up of ilmenite, chromite and a small amount of magnetite, the combination makes an electrode that has a more desirable candle power operation and life than when either of these ingredients are used separately.

It will be understood that the ingredients of the electrode may be varied somewhat. However, as a specific illustration, I give the following proportions of the ingredients:

| | Per cent. |
|---|---|
| Ilmenite | 76.5 |
| Chromite | 5.5 |
| Magnetite | 17.22 |
| Sodium fluoride | 0.28 |
| Lithium fluoride | 0.50 |

I do not wish to be strictly limited, however, to the exact proportions given inasmuch as in view of the disclosure variations may be made in the proportions without departing from the spirit of the invention or the scope of the claims contained herein.

What I claim as new and desire to secure by Letters Patent of the United States, is:

1. An electrode for an electric arc consisting of the following ingredients: ilmenite, chromite, magnetite, sodium fluoride and lithium fluoride.

2. An electrode for an electric arc comprising the following ingredients: ilmenite, magnetite, lithium fluoride and a flux of sodium fluoride.

3. An electrode for an electric arc consisting of the following ingredients: ilmenite 76.5%, chromite 5.5%, magnetite 17.22%, sodium fluoride 0.28%, and lithium fluoride 0.50%.

In witness whereof, I have hereunto set my hand this fifth day of January, 1927.

WILLIAM IRBY.